A. IWANICKI.
THEFT PREVENTING DEVICE.
APPLICATION FILED FEB. 19, 1916.
1,208,563.
Patented Dec. 12, 1916.
2 SHEETS—SHEET 2.
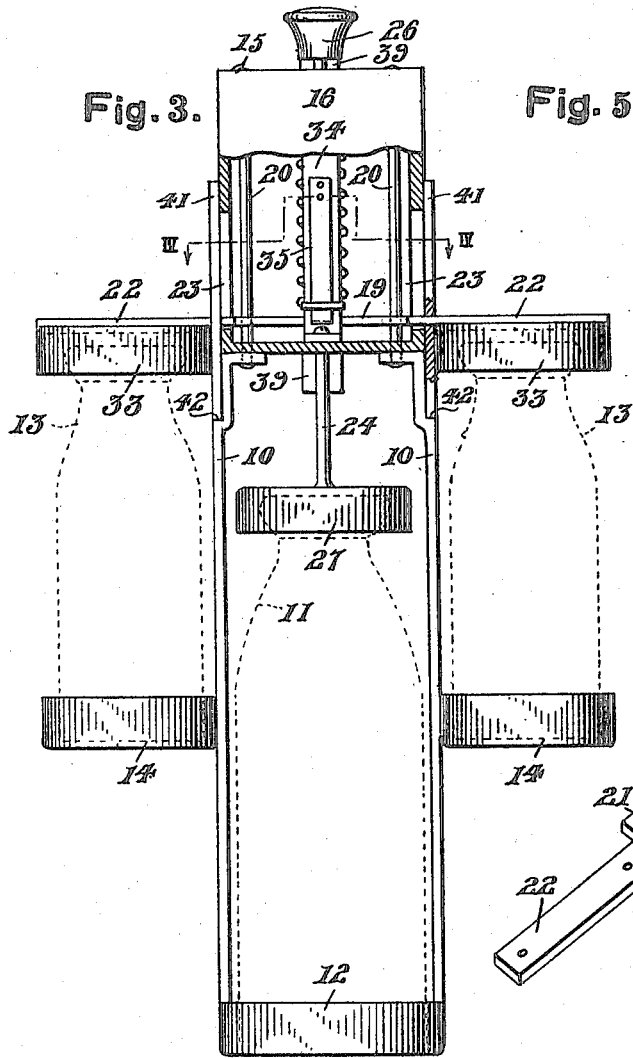
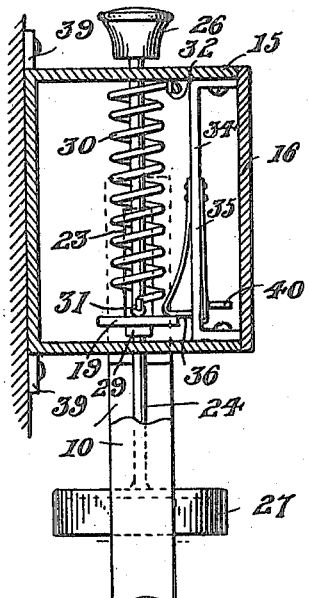
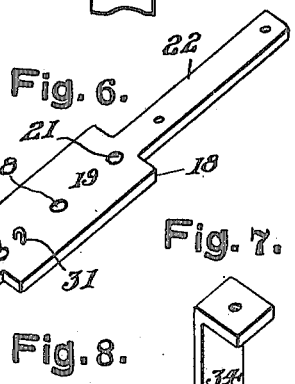
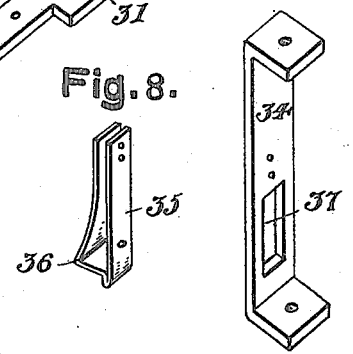
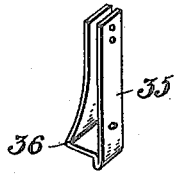
Inventor
A. Iwanicki
A. M. Wilson
Attorney

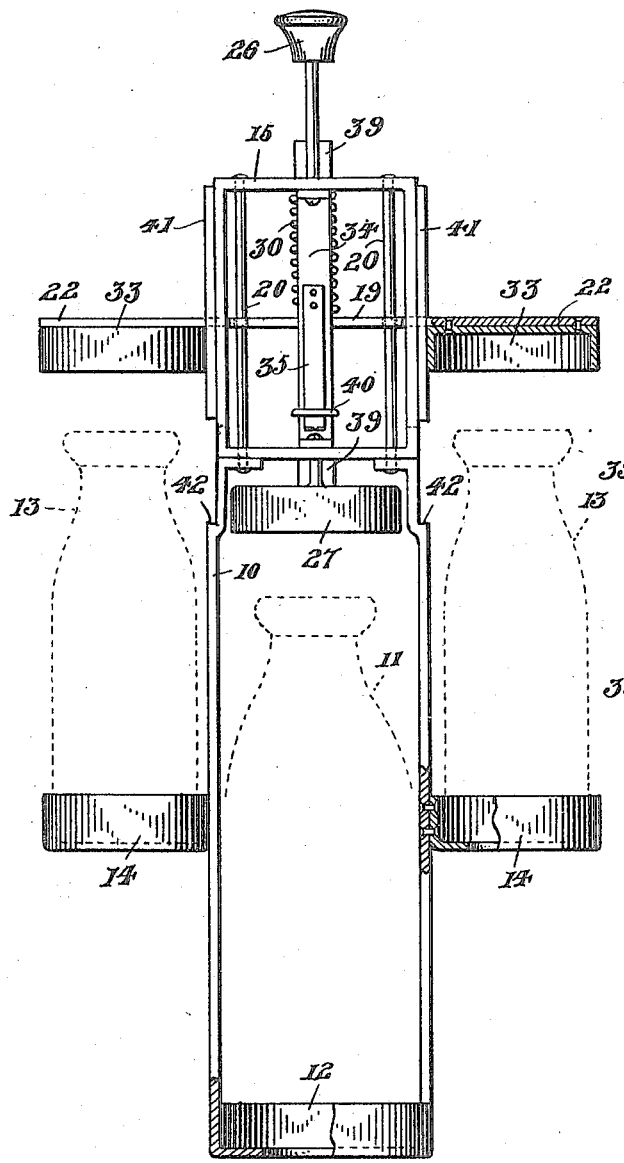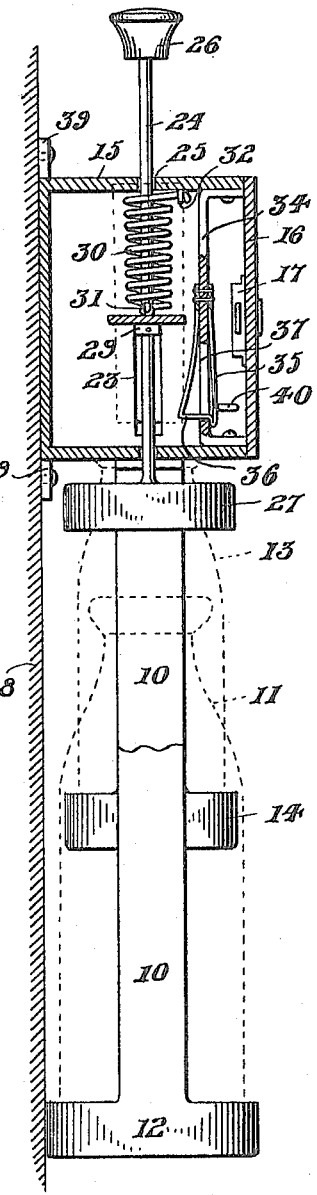

UNITED STATES PATENT OFFICE.

ANTONI IWANICKI, OF NEW YORK, N. Y.

THEFT-PREVENTING DEVICE.

1,208,563.    Specification of Letters Patent.    Patented Dec. 12, 1916.

Application filed February 19, 1916. Serial No. 79,323.

*To all whom it may concern:*

Be it known that I, ANTONI IWANICKI, subject of the Emperor of Austria-Hungary, residing at New York, in the county of New York and State of New York, have invented certain new and useful Improvements in Theft-Preventing Devices, of which the following is a specification.

This invention relates to certain new and useful improvements in theft-preventing devices.

The primary object of the invention is the provision of a receiving means for milk bottles and other receptacles for preventing unauthorized removal thereof and is especially adapted for employment in connection with the dispensing of milk to customers at their houses after the customary manner.

The device contemplates a handy receiving rack for one or more milk bottles adapted to be secured at any convenient point of access by the customer and whereby the milk vender may readily lock the bottles within the rack, it being impossible to remove the same without the use of a key held by the customer.

The invention further contemplates a device that is inexpensive to manufacture but which is efficient in preventing the loss of receptacles or bottles deposited for the reception by customers and avoiding the insecure practice of depositing said articles upon the door-steps of houses.

With these general objects in view and others that will appear as the nature of the invention is better understood the same consists in the novel combination and arrangement of parts hereinafter more fully described, illustrated in the accompanying drawings and pointed out in the appended claims.

In the drawings forming a part of this application and in which like-designating characters refer to corresponding parts throughout the several views:—Figure 1 is a front elevational view of the device partially broken away and illustrated in its open position, the arrangement of three milk bottles being shown in dotted lines. Fig. 2 is a vertical central sectional view taken through the same and the support to which the device is attached. Fig. 3 is a view similar to Fig. 1, but with the device in its sprung or locked closed position. Fig. 4 is a transverse sectional view taken upon line IV—IV of Fig. 3. Fig. 5 is a view similar to the upper portion of Fig. 2, but with the device locked. Fig. 6 is a perspective view of the shiftable cross-head for the locking device. Fig. 7 is a perspective view of the latch mounting bracket detached, and Fig. 8 is a perspective view of the spring-latch detached.

It being understood that the present device may be constructed for the reception of any desired number of containers or receptacles such as milk bottles, the same is herein illustrated having a U-shaped frame 10 adapted for holding three milk bottles, the larger or quart sized bottle 11 being adapted to fit within a centrally-arranged cup 12 at the bottom of the frame 10 while smaller or pint sized bottles 13 are positioned in oppositely-arranged similar cups 14 secured outwardly of the opposite side bars of the frame 10.

A casing 15 is carried at the top of the frame 10 and directly above the cup 12 and has a swinging forwardly-positioned door 16 hinged thereto for closing the front side of the casing and being normally retained closed by means of a usual form of lock 17.

A locking cross head 18 extends transversely through the casing 15 having a rectangular central portion 19 vertically shiftable therein and mounted upon opposite guide bars 20 which extend through perforations 21 in the said head portion 19, while the opposite arms 22 freely project through opposite openings 23' in the side walls of the said casing. An operating rod 24 vertically projects through centrally arranged openings 25 in the top and bottom of the casing 15, a hand-hold knob 26 being attached to the upper end of the rod above the casing and a cover 27 corresponding to the cup 12 being rigidly secured to the bottom of the said rod 24. The rod 24 and cup 27 being in axial alinement with the cup 12 and with a quart sized bottle 11 positioned therein, it will be evident that upon lowering the rod 24, the cup 27 will engage over the top portion of the milk bottle 11. The rod 24 is rigidly secured through a central opening 28 of the head portion 19 by a set collar 29 and a spring 30 encircles the rod 24 between the cross head 18 and the top of the casing 15 and has its opposite ends secured respectively thereto as at 31 and 32.

Separate cups 33 are dependingly attached to the cross head arms 22 in axial alinement above the side cups 14 and being adapted for engaging the upper portions of the pint bottles 13 when the cross-head is in its lower position.

A bracket 34 is mounted within the casing 15 and has a spring latch or catch 35 carried thereby as best illustrated in Fig. 2 of the drawings, the said latch having a locking foot 36 projecting inwardly through a slot 37 of the bracket 34 and positioned within the path of movement of the cross head portion 19.

From this detailed description of the device, the operation thereof will be apparent, the same being normally secured to a conveniently positioned wall 38 by means of lugs 39 carried by the casing 15, the cross head 18 with its rod 24 being held in its elevated position by the spring 30 and the door 16 being locked in its closed position. The vender of milk may then deposit a quart bottle 11 within the cup 12 and pint bottles 13 within the cups 14. The vender will then push downwardly upon the rod knob 26 against the action of the spring 30 until the cross head portion 19 is engaged by the foot 36 of the spring latch 35 which latch will retain the cross head depressed and with the cups 27 and 33 in their locked positions over the bottles 11 and 13 respectively. It will be then impossible to remove the milk bottles 11 and 13 without breaking the same or some portion of the device until the door 16 of the casing is opened by releasing the lock 17 and the spring latch 35 is withdrawn by means of the lip 40 which withdrawing of the latch allows the spring 30 to move the cross head 18 upwardly to its releasing position, so that the bottles 11 and 13 may be readily removed. Cover plates 41 are secured to the arms 22 and at all times substantially overlie and close the slots 23 for preventing any tampering with the spring release 40, the frame 10 being formed with cut-away portions or shoulders 42 to accommodate the said plates.

It will thus be seen that an inexpensive and strong device is arranged for preventing the loss of bottles of milk left by the vender at the houses of his customers.

While the form of the invention herein shown and described is what is believed to be the preferred embodiment thereof, it is nevertheless to be understood that minor changes may be made therein without departing from the spirit and scope of the invention as claimed.

What I claim as new is:—

1. A device of the class described comprising a frame, a cup at the bottom thereof, side cups intermediately positioned and carried by the said frame, a casing at the top of the said frame having opposite slots therein, a locking door for the said casing, a cross head having a rectangular central portion shiftably mounted within the said casing and having opposite arms projecting through the said slots, guide bars for the said rectangular portion, an operating rod vertically shiftable centrally through the said casing and secured to the said cross head intermediate its length, coöperating caps for the said cups and positioned in axial alinement therewith upon the said rod and arms, a retractile spring connected between the said cross head and the top of the casing, a bracket within the said casing, a releasable spring locking latch carried by the said bracket and positioned within the locking path of movement of the said cross head, and cover plates for the said casing slots carried by the arms.

2. A device of the class described comprising a frame, cups carried thereby, a casing positioned at the upper end of said frame, a cross head vertically slidable within said casing and including side legs projecting from the casing, cups carried by the cross head and side legs in vertical alinement with the aforesaid cups, a spring within the casing connected at one end to the upper end of the casing and at its other end to the cross head normally to hold the cross head elevated, a spring catch arranged within said casing and in the path of descending movement of the cross head to engage the cross head when lowered to hold the same in locked position, and means for releasing the spring catch.

3. A device of the class described comprising a frame, supports carried thereby, a casing carried by the upper end of the frame and having opposite openings therein, a cross head vertically slidable within the casing and extending through said openings, means carried by said cross head and associated with said casing openings to provide constant closures therefor, means for normally holding the cross head elevated, and locking means associated with the cross head for holding the same in lowered locked position.

4. A device of the class described comprising a frame, supports carried thereby, a casing carried by the upper end of the frame and having oppositely disposed openings therein, a cross head vertically slidably within said casing and extending through said openings, coöperative means carried by the cross head and frame to provide constant closures for said casing openings and to limit the lowering movement of the cross head, means for normally holding the cross head elevated, and locking means for holding the cross head in lowered position.

In testimony whereof I affix my signature.

ANTONI IWANICKI.

Copies of this patent may be obtained for five cents each, by addressing the "Commissioner of Patents, Washington, D. C."